United States Patent [19]

Schneider

[11] Patent Number: 5,087,129
[45] Date of Patent: Feb. 11, 1992

[54] APPARATUS FOR PRODUCING A HYDROSTATIC THRUST BEARING

[76] Inventor: Klaus O. Schneider, 9200 Cotharin Rd., Malibu, Calif. 90265

[21] Appl. No.: 614,204

[22] Filed: Nov. 16, 1990

[51] Int. Cl.$^5$ .............................................. F16C 32/06
[52] U.S. Cl. ............................................................ 384/12
[58] Field of Search ................. 384/12, 121, 124, 107, 384/111

[56] References Cited

U.S. PATENT DOCUMENTS

| | | | |
|---|---|---|---|
| 4,426,118 | 1/1984 | Mohsin | 384/121 |
| 4,496,194 | 1/1985 | Phillips | 384/12 |
| 4,717,263 | 1/1988 | Phillips | 384/12 |
| 4,946,293 | 8/1990 | Helms | 384/12 |

*Primary Examiner*—Lenard A. Footland
*Attorney, Agent, or Firm*—Ansel M. Schwartz

[57] ABSTRACT

An apparatus for producing a hydrostatic thrust bearing. The apparatus is comprised of a base. The apparatus is also comprised of a load disposed on the base. Additionally, the apparatus is comprised of a device for applying fluid at the load with respect to the base such that the load exhibits self-amplified chaotic motion from only the fluid applied to the load but the load cannot fall off the base. In a preferred embodiment, the base includes a chamber through which fluid from the applying device flows and is applied to the load. In a more preferred embodiment, the applying device includes a deflector disposed between the base and the load and adjacent the chamber such that fluid flowing through the chamber is diverted by the deflector before it is applied to the load. Additionally, the applying means includes a device for pumping fluid through the chamber. The pumping device is fluidically connected to the chamber to pump the fluid therethrough so that it can be applied to the load. In an even more preferred embodiment, the load has an indentation positioned about the deflector against which the fluid diverted by the deflector is applied.

12 Claims, 9 Drawing Sheets

APPARATUS FOR PRODUCING A HYDROSTATIC THRUST BEARING

FIELD OF THE INVENTION

The present invention pertains to an apparatus for producing a hydrostatic thrust bearing. More specifically, the present invention pertains to an apparatus for producing a hydrostatic thrust bearing such that a load exhibits a swing or chaotic system with respect to a base but which does not fall off of the base.

BACKGROUND OF THE INVENTION

Figure 10A:
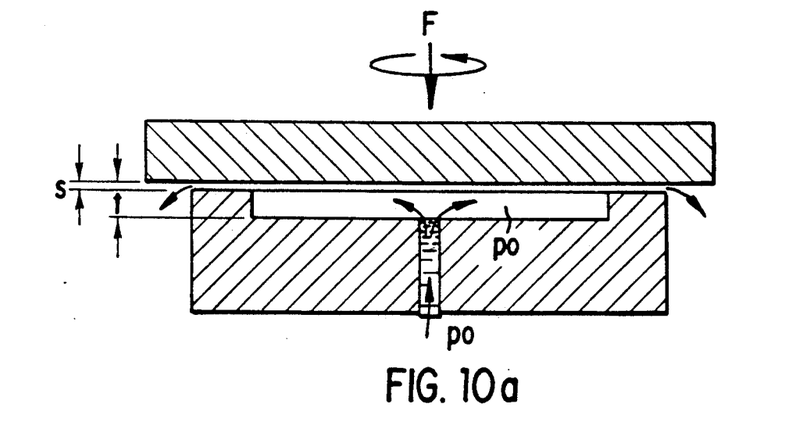
FIG. 10 is a schematic representation of a side view of the prior art thrust bearing.
Figure 10B:
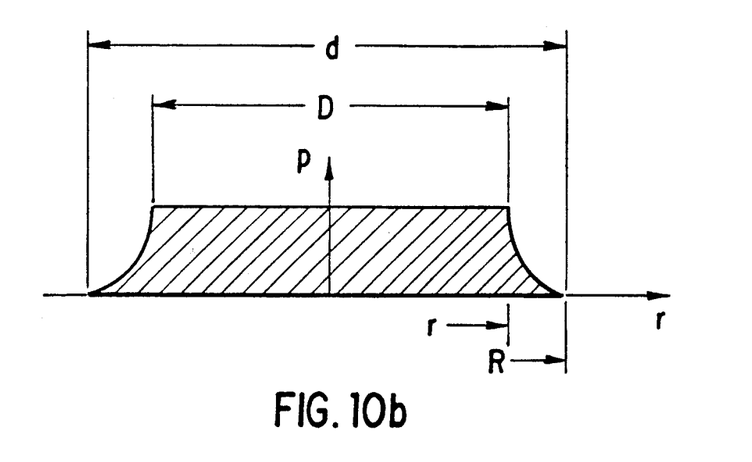
FIG. 10B is a graphic representation of the pressure field with respect to the prior art thrust bearing shown in FIG. 10A.

In a classic hydrostatic thrust bearing, as shown in FIG. 10A, a load F is maintained over a base. The pressure Po between the load F and the base is constant because fluid speed is low. However, the fluid speed in the gap S between the load F and the base is high, resulting in a pressure change. The press across the load F is shown in FIG. 10B. Since T >>S pressure Po is constant across D, the pressure declines in gap S because of friction. The gap S is established by flow Q, load F and the dynamic friction of fluid $\eta$. Such a thrust bearing is shown in FIG. 10A is usually used for turning thrust loads around a center axle. A slight lateral motion is also possible.

Figure 11:
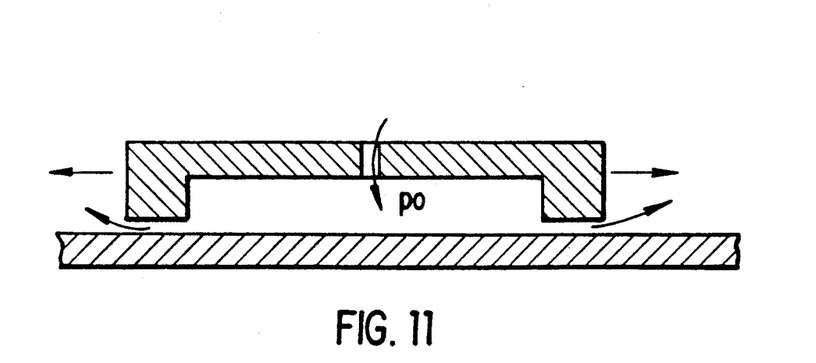
FIG. 11 is a schematic representation of another prior art thrust bearing.

In another existing version, as shown in FIG. 11, the fluid supply must be on the bearing or supplied with flexible hose in order to turn heavy loads or move them laterally. There is heretofore no thrust bearing that allows the load to move back and forth or randomly.

SUMMARY OF THE INVENTION

The present invention pertains to an apparatus for producing hydrostatic thrust bearing. The apparatus is comprised of a base. The apparatus is also comprised of a load disposed on the base. Additionally, the apparatus is comprised of means for applying fluid at the load with respect to the base such that the load exhibits self-amplified chaotic motion from only the fluid applied to the load but the load cannot fall off the base.

In a preferred embodiment, the base includes a chamber through which fluid from the applying means flows and is applied to the load.

In a more preferred embodiment, the applying means includes a deflector disposed between the base and the load and adjacent the chamber such that fluid flowing through the chamber is diverted by the deflector before it is applied to the load. Additionally, the applying means includes means for pumping fluid through the chamber. The pumping means is fluidically connected to the chamber to pump the fluid therethrough so that it can be applied to the load.

In an even more preferred embodiment, the load has an indentati-on positioned about the deflector against which the fluid diverts by the deflector is applied.

BRIEF DESCRIPTION OF THE DRAWINGS

In the accompanying drawings, the preferred embodiments of the invention and preferred methods of practicing the invention are illustrated in which:

FIG. 3 is a bottom view of a portion of the present invention.

FIG. 7A is a side view of a portion of an alternative embodiment of the present invention.

DESCRIPTION OF THE PREFERRED EMBODIMENT

Figure 1:
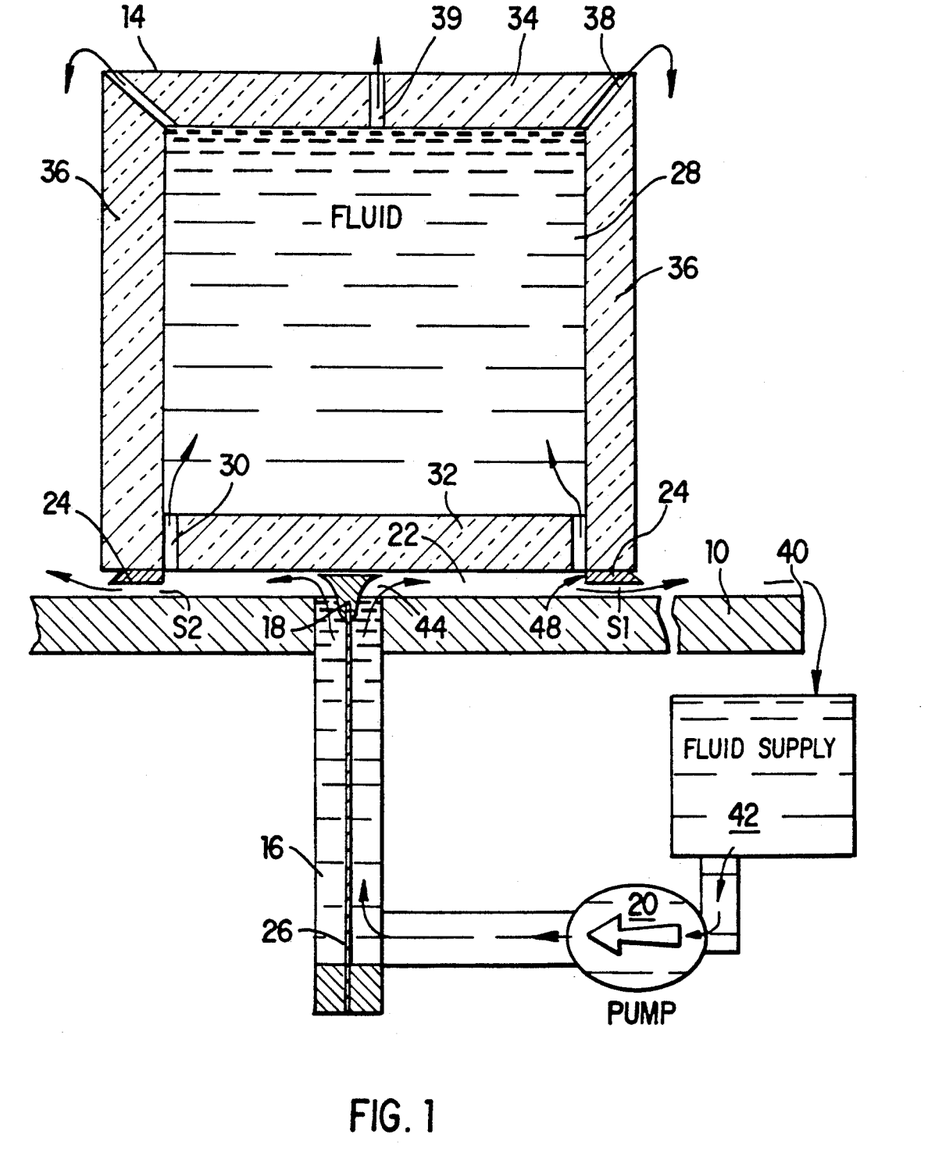
FIG. 1 is a schematic representation of the apparatus of the invention.

Referring now to the drawings wherein like reference numerals refer to similar or identical parts throughout the several views, and more specifically to FIG. 1 thereof, there is shown a schematic representation of an apparatus 10 for producing a hydrostatic thrust bearing. The apparatus 10 is comprised of a base 12. The apparatus 10 is also comprised of a load 14 disposed on the base 12. Additionally, there is means for applying fluid at the load 14 with respect to the base 12 such that the load 14 exhibits self-amplified chaotic motion from only the fluid applied to the load 14 but the load 14 cannot fall off of the base 12. The fluid can be, for instance, oil or water.

Preferably, the base 12 includes a chamber 16 through which fluid from the applying means flows and is applied to the load 14. Preferably, the applying means includes a deflector 18 disposed between the base 12 and the load 14, and adjacent the chamber 16 such that fluid flowing through the chamber 16 is diverted by the deflector 18 before it is applied to the load 14. The applying means also preferably includes means 20 for pumping fluid through the chamber 16. Preferably, the deflector 18 is supported by a steel spring rod 26 that extends through the chamber 16 but essentially does not impede the flow of fluid therethrough. The pumping means is fluidically connected to the chamber 16 to pump the fluid therethrough so that it can be applied to the load 14.

The load 14 preferably has an indentation 22 positioned about the deflector 18 against which fluid diverted by the deflector 18 is applied. Preferably, the indentation 22 is formed by a ridge 24 extending about the bottom of the load 14. The ridge 24 can be formed by being glued, for instance, to a bottom plate 34 of the load 14, or formed by side plates 36 extending beyond bottom plate 32 of the load 14.

Preferably, the load 14 is in the shape of a cube. The cube can have a cavity 28. Preferably, the cavity 28 is fluidically connected to the indentation 22 such that fluid in the indentation 22 can flow into the cavity 28. Preferably, the load 14 has indentation holes 30 symmetrically disposed about its bottom plate 32 through which fluid in the indentation 22 flows into the cavity 28. Moreover, the load 14 preferably has a top plate 34 which is connected to side plates 36 of the load 14 such that the top plate 34 appears to float on the fluid that fills the cavity 28 creating an opening 38 between the top plate 34 and the side plates 36 and the fluid in the cavity 28 can flow out of the cavity 28 through the opening 38. A center hole 39 can exist to keep the top plate 34 wet. Preferably, the load 14 is made of glass and the distance between opposing corners of the ridge 24 is less than the distance between the deflector 18 and the edge 40 of the base 12.

In the operation of the preferred embodiment, water from fluid supply 42 is pumped by pump means 20 into the chamber 16. The chamber 16 is disposed essentially in the center of base 12.

A deflector 18 is fixedly positioned at the outlet 44 of chamber 16. The deflector 18 is supported by a steel spring rod 26 that is anchored in the chamber 16. The rod 26 essentially does not impede the flow of water through the chamber 16.

As the water exits the chamber 16 at the outlet 44, it is deflected by the deflector 18 in essentially a perpendicular direction from which it came. This new direction is essentially parallel with the surface 46 of the base 40.

The moving water fills the indentation 22 as well as exiting the indentation through indentation holes 30 in the bottom plate 32 of the load 14 and through the gaps S formed between the bottom of the ridge 24 and the surface 46 of base 12. The gap S changes to heights of $S_1$ and $S_2$ on opposite sides.

Because the distance in the indentation between the bottom plate 32 and the surface 46 of the base 12 is greater than the gap S and because of the presence of the deflector 18, a differential in pressure is created across the bottom of the load 14. This pressure differential causes the load 14 to move off center. As one side of the load 14 gets closer to the deflector 18, the impulse force from the moving water on the edge 48 of the closest side to the deflector 18, as well as the increased difference in frictional force due to the water flowing through the gap S at different speeds due to different heights $S_1$ and $S_2$ on opposite sides, causes the load 14 to slow down, stop and then change its direction to move back towards center. The force from friction and the impulse force present on the side furthest from the deflector 18 is not as great as the force present on the side nearest the deflector 18 since the water deflected from the deflector is further away and thus at a lower velocity in the chamber 22 as well as the fluid speed in gap S being lower at the increased height $S_2$.

In addition, in order for the load to be maintained above the base 12, the pressure on the side of the load 14 closest to the deflector increases while the gap S closest to the deflector 18 decreases. The water passing through this gap accordingly speeds up in order to maintain the quantity of water per unit time passing therethrough. The increased velocity of the water increases the frictional force opposing the movement of the load 14. In contrary fashion, the gap S that is furthest from the deflector 18 increases in size resulting in a lower frictional force being present relative to the frictional force from the opposite gap S.

Because of a lag time before the shift in frictional force takes effect and together with the impulse force causes the load 14 to move back towards center, when the load actually does stop and then reverse its direction, the forces have built up to an extent greater than is actually necessary to return the load top center and causes the load 14 instead to overshoot center. Then, the process repeats itself, essentially back and forth or side to side or anything in between follow a chaotic motion.

When the situation arises that the load 14 moves so far as to cause an edge 48 to contact the deflector 18, the deflector 18 acts as a stop, preventing the load 14 from moving further and ultimately falling off the edge 40 of the base. Moreover, by the rod 26 being of a steel spring type, when the load 14 contacts the deflector 18, the deflector 18 further serves as a damper to absorb some of the energy to ease the impact of the load 14 against the deflector 18.

Figure 2:
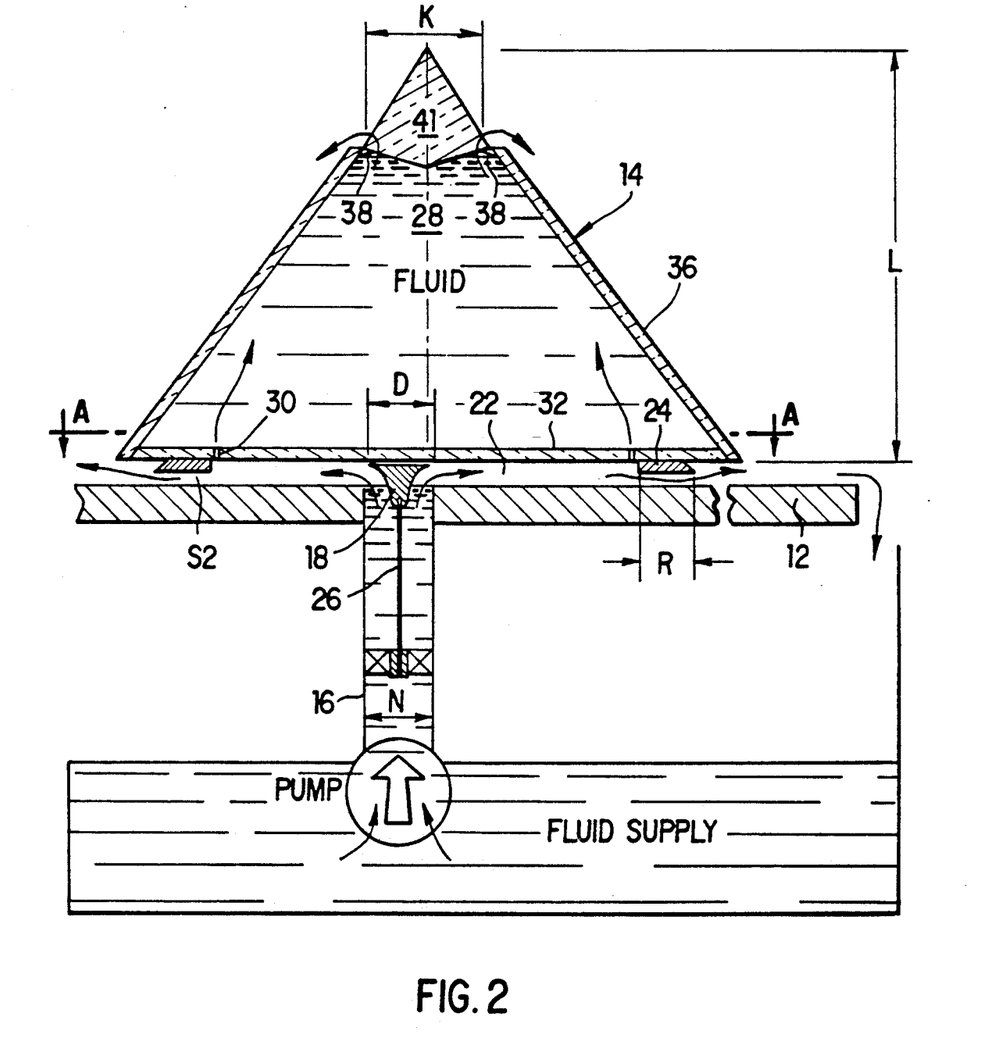
FIG. 2 is a cross-sectional side view of a portion of the present invention.
Figure 4:
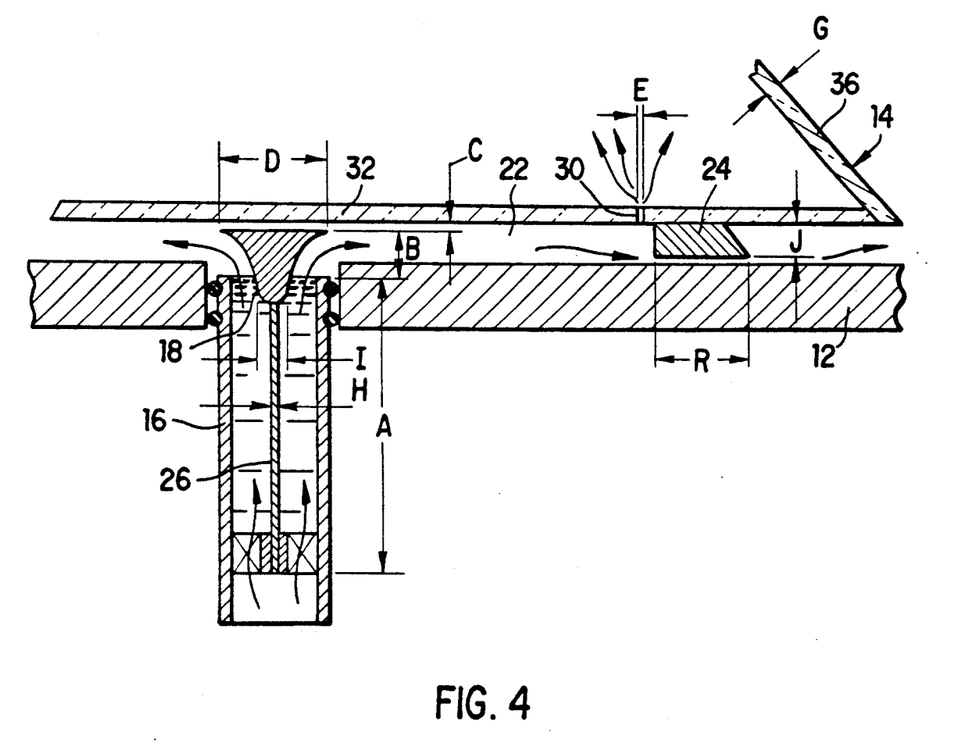
FIG. 4 is a cross-sectional view of a portion of the present invention.

The parameter and dimensions of the preferred embodiment with a cap 11 instead of a top plate 34 and a pyramid shape for less weight towards the top of the load 14 are the following with reference to FIGS. 2, 3 and 4:

| weight of load with water flow Q | 45 kg 100 lit/min |
|---|---|
| A | 240 mm |
| B | 6 mm |
| C | 1 mm |
| D | 50 mm |
| E | .8 mm |
| F | 25 mm |
| G | 12 mm |
| H | 6 mm |
| I | 14 mm |
| J | 6.5 mm |
| K | 124 mm |
| L | 310 mm |
| M | 50 mm |
| N | 39 mm |
| O | 490 mm |
| P | 430 mm |
| Q | .8 mm |
| R | 25 mm |
| T | 100 mm |
| U | 500 mm |

FIG. 2 is a cross-sectional view of a portion of apparatus 10. FIG. 3 is a bottom view of a portion of the apparatus 10. Additionally, FIG. 4 is a more detailed view of a portion of the apparatus 10.

For exemplary purposes, a generalized, although simplistic understanding of the operation of the invention can be had by realizing the weight of the load 14 needs to be supported by the pressure cushion.

$$\int_{x_2}^{x_1} p(x)\, da = \text{load } F.$$

Furthermore, the load 14 has to be balanced around its own center ($\Sigma M = \phi$).

$$\int_{x_2}^{x_1} p(x) \cdot x \cdot da = 0.$$

Figure 6:
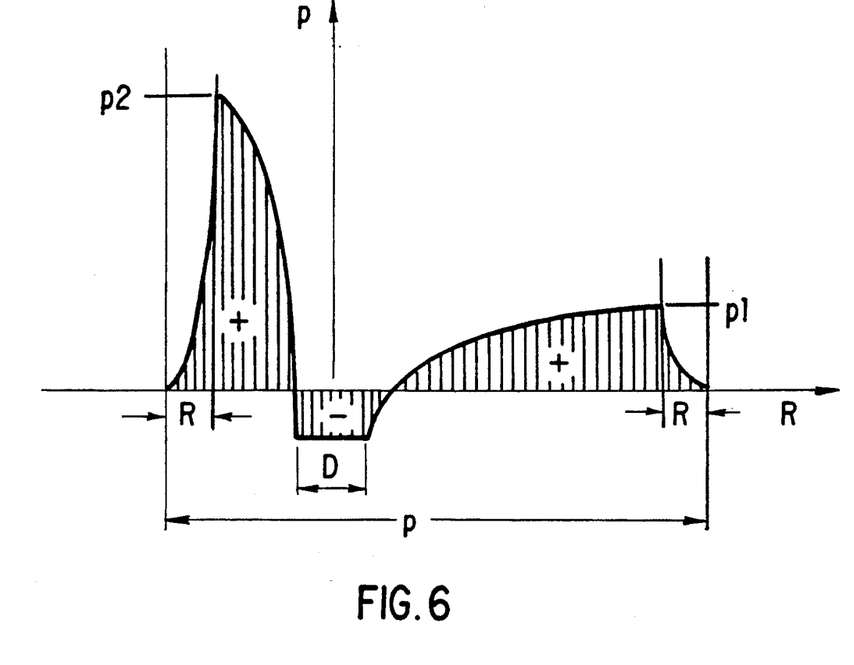
FIG. 6 is a graphic representation of the pressure field with respect to the load having moved off center to the left with respect to the base of the present invention.

Therefore, the pressure field has to change to establish this balance by increasing pressure on the left side as the load 14 moves to the right side as shown in FIG. 6. FIG. 6 is a graphic representation of the pressure p with respect to the X direction of load 14 that has moved toward the right. The pressure $P_2$ (pressure before the gap S on the left side at height $S_2$) can only be established higher than the pressure $P_1$ (pressure before the gap S on the right side at height $S_2$) by decreasing the gap S to a height of $S_2$.

$$S_2 < S_1 \rightarrow P_2 > P_1$$

for a constant fluid flow rate Q.

If the gap $S_2$ is treated like a pipe outflow having a length L of a task without friction, then based on Bernoulli's equation, the outflow speed of the fluid W is $$W^2 = P \cdot (1 \cdot g/\gamma)$$

where $\gamma$ is the specific weight of fluid. Thus, speed increases with pressure.

With friction present in the outflow pipe and assuming lamina flow, the pressure less $\Delta PR$ due to friction is $$\Delta PR = W \cdot (L/S^2) \cdot \eta \cdot 32 \sim W/S^2$$

Thus, increased W $\rightarrow$ increases friction $\Delta PR$, decreased gap S $\rightarrow$ increases friction $\Delta PR$ drastically. (If turbulent flow is present, then the same tendencies exist but even stronger.) The pressure loss $\Delta PR$ within the gap (pipe) is caused by friction along the wall. The resulting force within the pipe length L is $$R = \Delta PR \cdot A \cdot L \sim \Delta PR \text{ where}$$

A is the pipe cross section.

Figure 5:
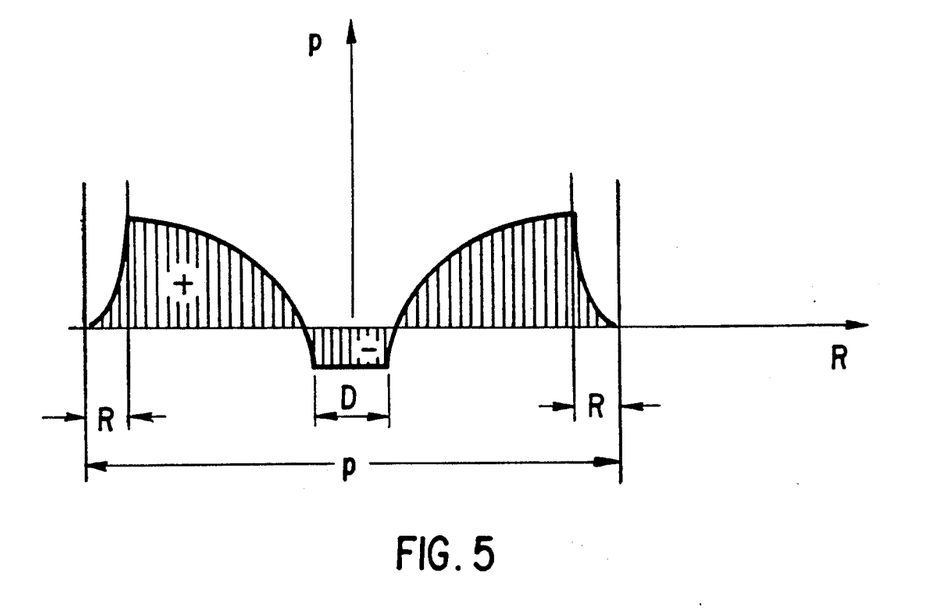
FIG. 5 is a graphic representation of the pressure field with respect to when a load is centered over a base.

Consequently, if the load 14 has moved off center, the pressure field has to change from that depicted in FIG. 5, which is a graphic representation of the pressure with respect to the X dimension for the load 14 centered, to that depicted in FIG. 6 to establish a new balance. This causes $P_2$ to increase, $W_2$ to increase, gap S to decrease to a height of $S_2$ and therefore drastically increase friction at this side of the gap. However, because of the inertia of the load 14, this happens gradually. The result is a swing system. If two-dimensional motion occurs in the x and z directions, a chaotic motion results.

Depending on the flow rate Q, the swing amplification can be controlled. With high flow rate Q, the load 14 continually increases its movement until it bounces from side to side. With low flow rate Q, the movement of the load 14 decreases until it settles in the center. With a balanced constant flow rate Q, the load 14 will start swinging from center and keep swinging randomly with slight changes, randomly turning and changing x, z movement. The low flow rate can be used to keep the load 14 wet at all times but without any motion present. This state can be used if the load 14 is maintained outside and there is a storm. It stops the motion for safety so it is not moved around by external forces.

Figure 7B:
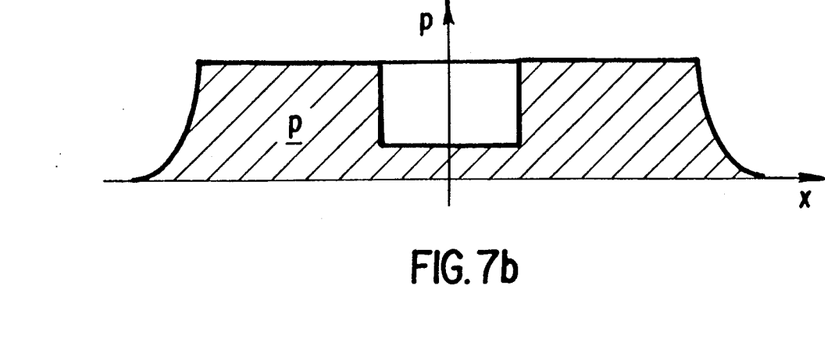
FIG. 7B is a graphic representation of the pressure field with respect to the alternative embodiment depicted in FIGS. 7 and 8.

In an alternative embodiment, the load 14 is able to exhibit a swing system, that is, go back and forth in one dimensional motion on the base 12. Referring to FIG. 7, a load 14 has a rise 50 that surrounds the deflector 18. The rise 50 results in a gap 50 which is smaller than the distance between the surface 46 of the base 12 and the bottom plate 42 outside of the rise 50. Because of the rise 50, pressure is reduced along the rise 50 as shown in FIG. 7B. FIG. 7b is a graph depicting the pressure field corresponding to a given position along the bottom plate 42. This resulted pressure causes the load 14 to move back and forth only in the X direction.

Figure 8:
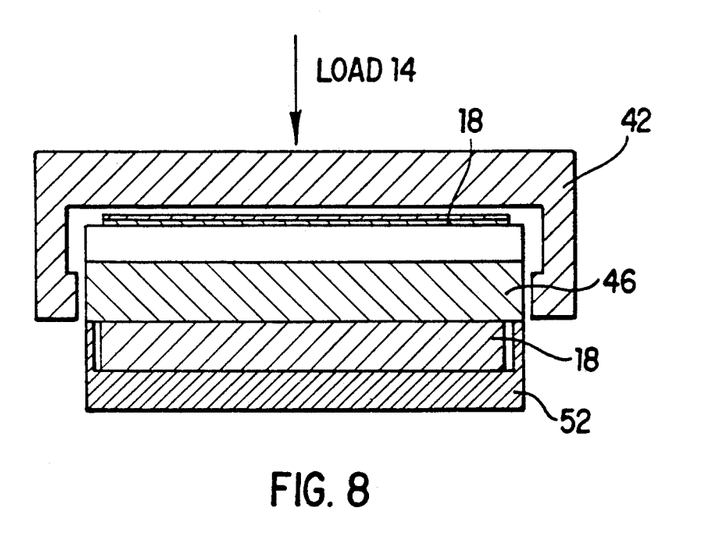
FIG. 8 is a side view of a portion of the alternative embodiment of the present invention.
Figure 9:
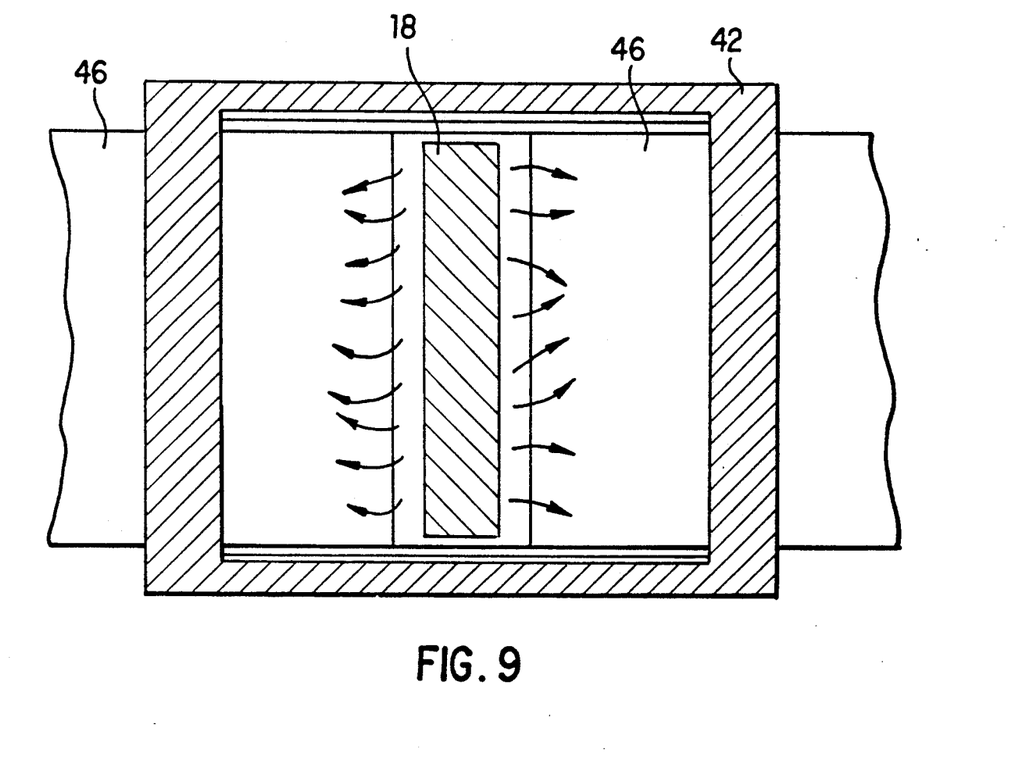
FIG. 9 is an overhead view of a portion of the alternative embodiment of the present invention.

Referring to FIG. 8, there is shown a section C—C view from FIG. 7A. As is shown in FIG. 8, the load 14 is preferably of a C shape which is positioned about a guide 52. The load 14 moves back and forth on the guide 52 under the action of the fluid flow essentially as described above. There is allowed for overflow on the sides just for guidance purposes. FIG. 9 is an overhead view of the swing system.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. An apparatus for producing a hydrostatic thrust bearing comprising:
   a base;
   a load disposed on the base; and
   means for applying fluid at the load with respect to the base such that the load exhibits self-amplified chaotic motion from only the fluid applied to the load but the load cannot fall off of the base.

2. An apparatus as described in claim 1 wherein the base includes a chamber through which fluid from the applying means flows and is applied to the load.

3. An apparatus as described in claim 2 wherein the applying means includes a deflector disposed between the base and the load and adjacent the chamber such that fluid flowing through the chamber is diverted by the deflector before it is applied to the load; and includes means for pumping fluid through the chamber, said pumping means fluidically connected to the chamber to pump the fluid therethrough so that it can be applied to the load.

4. An apparatus as described in claim 3 wherein the load has an indentation positioned about the deflector against which fluid diverted by the deflector is applied.

5. An apparatus as described in claim 4 wherein the indentation is formed by a ridge extending about the bottom of the load.

6. An apparatus as described in claim 5 wherein the deflector is supported by a steel springed rod that extends through the chamber but essentially does not impede the flow of fluid therethrough.

7. An apparatus as described in claim 6 wherein the load is in the shape of a cube.

8. An apparatus as described in claim 7 wherein the cube has a cavity.

9. An apparatus as described in claim 8 wherein the cavity is fluidically connected to the indentation such that fluid in the indentation can flow into the cavity.

10. An apparatus as described in claim 9 wherein the load has indentation holes symmetrically disposed about its bottom plate through which fluid in the indentation flows into the cavity; and wherein the load has a top plate which is connected to side plates of the load such that the top plate appears to float on the fluid that fills the cavity creating an opening between the top plate and the side plates and the fluid in the cavity can flow out of the cavity through the opening.

11. An apparatus as described in claim 10 wherein the load is made of glass.

12. An apparatus as described in claim 11 wherein the distance between opposing corners of the ridge is less than the distance between the deflector and the edge of the base.

* * * * *